United States Patent [19]

Huang et al.

[11] Patent Number: 4,966,934

[45] Date of Patent: Oct. 30, 1990

[54] BIOLOGICAL COMPATIBLE ADHESIVE CONTAINING A PHOSPHOROUS ADHESION PROMOTER AND ACCELERATOR

[75] Inventors: Chin-Teh Huang, Dover, Del.; Gordon B. Blackwell, Konstanz, Fed. Rep. of Germany

[73] Assignee: Dentsply Research & Development Corp., Milford, Del.

[21] Appl. No.: 369,377

[22] Filed: Jun. 21, 1989

Related U.S. Application Data

[63] Continuation-in-part of Ser. No. 258,304, Oct. 14, 1988, which is a continuation-in-part of Ser. No. 939,601, Dec. 9, 1986, Pat. No. 4,816,495, which is a continuation-in-part of Ser. No. 676,135, Nov. 29, 1984, Pat. No. 4,652,941.

[51] Int. Cl.$^5$ .................. C08K 5/10; C08K 5/07; C08K 5/05; C08J 7/04

[52] U.S. Cl. .................. 524/315; 522/14; 522/17; 522/22; 522/27; 522/64; 522/171; 523/115; 523/116; 523/118; 524/361; 524/375; 524/376; 524/547

[58] Field of Search .................. 523/115, 118, 116; 522/14, 17, 22, 27, 64, 171, 90; 524/375, 376, 547, 361, 315

[56] References Cited

U.S. PATENT DOCUMENTS

| | | | |
|---|---|---|---|
| 3,629,187 | 12/1971 | Waller . | |
| 3,709,866 | 1/1973 | Waller . | |
| 3,759,809 | 9/1973 | Carlick et al. . | |
| 4,182,035 | 1/1980 | Yamauchi et al. . | |
| 4,222,780 | 9/1980 | Shibatani et al. . | |
| 4,235,633 | 11/1980 | Tomioka et al. . | |
| 4,259,117 | 3/1981 | Yamauchi et al. . | |
| 4,368,043 | 1/1983 | Yamauchi et al. . | |
| 4,439,554 | 3/1984 | Argentar | 523/115 |
| 4,459,193 | 7/1984 | Ratcliffe et al. . | |
| 4,499,251 | 2/1985 | Omura et al. . | |
| 4,514,342 | 4/1985 | Billington et al. | 433/228.1 |
| 4,539,382 | 9/1985 | Omura et al. | 524/447 |
| 4,540,722 | 9/1985 | Bunker | 523/109 |
| 4,612,384 | 9/1986 | Omura et al. | 522/171 |
| 4,650,847 | 3/1987 | Omura et al. | 524/547 |
| 4,657,941 | 4/1987 | Blackwell et al. | 522/171 |
| 4,669,983 | 6/1987 | Bunker | 523/115 |
| 4,670,576 | 6/1987 | Bunker | 523/155 |
| 4,675,358 | 6/1987 | Frangou | 524/547 |
| 4,719,149 | 1/1988 | Aasen et al. | 523/116 |
| 4,760,122 | 7/1988 | Nakos et al. | 526/242 |
| 4,855,475 | 8/1989 | Bunker | 558/182 |

FOREIGN PATENT DOCUMENTS 559648 7/1958 Canada .
0084407 7/1983 European Pat. Off. .

*Primary Examiner*—Herbert J. Lilling
*Attorney, Agent, or Firm*—David E. Wheeler; D. James Picciano; Edward J. Hanson, Jr.

[57] ABSTRACT

A biologically compatible adhesive dental primer that is shelf stable as a single component adhesive and includes a mixture of an adhesive promoting and polymerizable monomer system having a free radical polymerizable monomer or prepolymer having ethylenic unsaturation and a phosphorus containing adhesion promoter which is free from halogen atoms bonded directly to a phosphorus atom, and optionally a free radical polymerization catalyst, and an accelerator for the catalyst.

8 Claims, No Drawings

BIOLOGICAL COMPATIBLE ADHESIVE CONTAINING A PHOSPHOROUS ADHESION PROMOTER AND ACCELERATOR

RELATED APPLICATIONS

This application is a continuation-in-part of U.S. Application Ser. No. 258,304, filed Oct. 14, 1988, which is a continuation-in-part of U.S. Application Ser. No. 939,601, filed Dec. 9, 1986, now U.S. Pat. No. 4,816,495 which is a continuation-in-part of U.S. Ser. No. 676,135, filed Nov. 29, 1984 now U.S. Pat. No. 4,652,941.

BACKGROUND OF THE INVENTION

This invention relates to compositions which are polymerizable by means of free radical initiation, and more particularly, to dental adhesive and primer compositions having improved adhesion to dentin, enamel and bone.

It is most desirable, when filling a tooth cavity with a filling material, such as a polymerizable dental restorative, to ensure good adhesion between the tooth surrounding the cavity and the set (polymerized) filling material since there is thereby obtained a good seal between the set filling material and the tooth which prevents, or at least markedly inhibits, ingress of mouth fluids and bacteria into the filled cavity and thus prevents further decay or loss of the filling material. In order to achieve good adhesion between the filler material and the tooth enamel, it has been recommended to provide a primer or adhesive bonding layer intermediate the filling material and surfaces of a prepared tooth. As disclosed, for example, in Canadian Patent No. 559,648 to Hagger, the bonding intermediate layer, which acts as an adhesive, should present polar groups toward the inorganic crystal lattice (apatite) of the tooth and be anchored by means of a non-polar group in the filling material. In order to accomplish this goal, it was taught to utilize dimethacrylglycerophosphoric acid as a polymerizable intermediate adhesive bonding layer. In practice, the surfaces in a prepared cavity of a tooth were dampened with the dimethacrylglycerophosphoric acid, usually in an alcohol medium, whereafter a paste of the filling material (monomer, polymer and room temperature effective catalyst such as sulfinic acid) was plugged into the cavity. The catalyst then caused simultaneous setting of the adhesive and filling material at the temperature in the mouth. It was also disclosed to dissolve the catalyst in the polymerizable adhesive and to spread the polymerizable adhesive solution on the surface to be bonded.

The technique disclosed in the Hagger patent was effective for bonding tooth enamel, dentin and ivory with the polymerizable filling materials existing at that time.

Another approach for aiding in the secure placement of fillings, that has been in general use for a number of years now, is the approach of first acid etching the dental preparation and then applying a low viscosity resin to penetrate the interiors caused by etching and thus prime or line the dental preparation. The primer layer is then cured, whereafter a higher viscosity polymerizable filling material is applied to the preparation. The primer usually is a lower viscosity form of the same base polymerizable filling material that will be used to fill the tooth, the difference in viscosity being primarily the result of the addition of less filler to the resin. Because the primer is basically the same system as the filling, compatibility has generally not been a severe problem.

However, as the field of polymerizable dental restorative materials has developed a need for still further improved primers and adhesives has become self-evident, particularly with respect to the need for greater bonding strength and reduction of marginal leakage between exposed dentin and enamel surfaces and the restorative filling materials.

This need lead to the development of two part chemically cured adhesives, such as those described in U.S. Pat. No. 4,182,035 to Yamauchi et al. and in European Patent application No. 0084407 to Bunker (corresponds to publication number 0058483). The adhesive described in the Yamauchi et al. patent comprises a first package consisting of a free radical polymerizable monomer and a diacyl peroxide, and a second package comprising an alkali or alkaline earth metal salt of an arylsulfinic acid and a volatile solvent. The adhesive disclosed in the Bunker application comprises a polymerizable phosphorous compound, a tertiary amine, a polymerization catalyst, a diluent, and an effective amount of a metal selected from iron, copper, manganese, cobalt, tin, chromium, nickel and zinc dissolved in a polar solvent. The metal dissolved in the polar solvent is stored separately from the remainder of the composition and is added thereto prior to the application of the adhesive to a tooth surface.

While self-curing multi-part systems of the type described above can provide improved adhesion between a tooth surface and a polymerizable filling material, the limitations associated with the need for storing two or more components in separate containers until immediately before use can not be minimized. For example, the need for mixing several components prior to use requires not only time, but skill, since it is essential that the proper proportions of polymerizable material, catalyst and accelerator be mixed, without the inclusion of air bubbles, which act as a polymerization inhibitor, so as to ensure the formation of a polymerized adhesive having the desired physical characteristics. Then, too, polymerizable adhesives of the above type normally have limited working times available and must be hardened for a predetermined length of time before a polymerizable filling material can be plugged over the adhesive in the cavity. Following this, one must wait until the filling material and the underlying adhesive have hardened sufficiently to allow the filling material to be shaped and finished with burrs and/or abrasives and the like in order that the rigid filling material does not transmit forces which can dislodge and break or exceed the adhesive bond strength of the newly placed two component adhesive to dentin.

Finally, self-curing two part adhesive systems of the type described above, preferably are used with multi-part self-curing filler materials.

One of the recent advances in polymerizable filling systems has been the one component light curing composite filling material that can be cured in from about 5 to about 40 seconds as contrasted to the 5 to 15 minutes of cure time required for the self-curing two component system and does not require dentist office time for mixing. One component light curing filling materials are premixed in the factory to include all catalysts and activators in a single component package that is essentially free of air, needs no subsequent mixing and is sold in a light-tight package in order to exclude activating light. These light curing one component composite filling materials may be applied directly into the prepared restorative cavity and are hardened in a matter of seconds by the application of visible or ultraviolet light. This new one component product has brought about a need for new and improved primers and adhesives which are compatible with strong biologically safe adhesion to the tooth and to the new filling materials. Preferred new primers and adhesives would, in most instances, be convenient one component actinic light cure compositions.

SUMMARY OF THE INVENTION

It is, therefore, an object of this invention to provide an improved primer or adhesive composition for the hard tissues of the human body which displays firm, sustained adhesion to bones and to dentin and enamel of teeth and which, when applied to the human body, can be cured by brief exposure to actinic light.

It is another object of this invention to provide an adhesive composition which is in the form of a stable one component system that is especially useful as a dental adhesive when light cured.

Yet another object is to provide a dental adhesive composition which is compatible with one component light cure filling materials and which is, itself, a one component system which is curable by exposure to visible light.

DETAILED DESCRIPTION

The above and other objects and advantages are accomplished in accordance with the present invention by providing in one aspect, an adhesive composition comprising a free radical polymerizable monomer or prepolymer having ethylenic unsaturation; a phosphorus derivative which is free from halogen atoms covalently or otherwise bonded directly to a phosphorus atom, preferably a polymerizable phosphorus derivative, having ethylenic unsaturation and being free from halogen atoms bonded to a phosphorus atom; a catalyst, preferably a photosensitive catalyst, especially a diketone; a sulfinic acid (or a salt thereof) or an amine (or amine salt), preferably both a sulfinic acid (or salt thereof) and an amine (or salt thereof); and optionally a solvent for the above ingredients. It should be understood that when a phosphorus derivative having ethylenic unsaturation is used, the phosphorus derivative may function as part or all of the polymerizable monomer or prepolymer. The adhesive composition of this invention is in the form of a shelf-stable one component polymerizable system which obviates the difficulties of the prior art and which, when cured, exhibits exceptionally high adhesive bond strengths between tooth or bone surfaces, particularly dentin, and subsequently applied filling materials.

Thus, while it is known that sulfinates have been used in catalytic quantities in self-curing compositions, especially those containing polymerizable partial esters of phosphoric acid, a peroxide and a polymerizable monomer as one component, and an alkali metal salt of an arylsulfinic acid and an amine and solvent therefor as a second component, it was unexpected to find it possible to combine a polymerizable monomer or prepolymer, a polymerizable phosphate which is free from halogen atoms bonded directly to phosphorus, an amine and a sulfinate in a one component system which is both stable and useful as a dentin adhesive when light cured.

As the free radical-polymerizable monomer or prepolymer to be employed in this invention, use may be made of any monomer, dimer, trimer, or other oligomer of the type that is usable in dental applications. Thus, the polymerizable monomer portion of the present adhesive composition generally comprises one or more monofunctional or polyfunctional ethylenically unsaturated monomers or prepolymers, e.g., dimers, trimers, and other oligomers, or mixtures or copolymers thereof, based on acrylic or methacrylic or itaconic acid, or derivatives thereof, including their esters which can be polymerized by free radical initiation. These materials include, but are not limited to acrylic and methacrylic acid, itaconic acid and the like, acrylic or methacrylic or itaconic acid esters of monohydric or polyhydric alkanols or polyhydric alcohols containing at least one phenyl group. Examples of such compound include monovinylmethacrylates, e.g., methylmethacrylate, ethyl acrylate, propyl methacrylate, hydroxyethylmethyacrylate, hydroxypropylmethacrylate, diethylene glycol acrylate, triethylene glycol acrylate, the monoester of trimellitic acid with hydroxyethyl methacrylate, hydroxypropyl itaconate and the like, esters of aliphatic polyhydric alcohols, such as for example, the di- and polyacrylates, the di- and polymethacrylates, and the di- and polyitaconates of alkylene glycols, alkoxylene glycols, alicyclic glycols and higher polyols, such as ethylene glycol, triethylene glycol, tetraethylene glycol, tetramethylene glycol, trimethylolethane, trimethylolpropane, pentaerythritol, dipentaerythritol, tripentaerythritol, and the like, or mixtures of these with each other or with their partially esterified analogs, and their prepolymers, such compound or mixture optionally having free hydroxyl content. Typical compounds of this type, include but are not limited to, trimethylolpropane triacrylate, trimethylolethane triacrylate, trimethylolpropane trimethacrylate, trimethylolethane trimethacrylate, tetramethylene glycol dimethacrylate, ethylene glycol dimethacrylate, triethylene glycol dimethacrylate, tetraethylene glycol diacrylate, tetraethylene glycol dimethacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexacrylate, tripentaerythritol octaacrylate, pentaerythritol dimethacrylate, pentaerythritol trimethacrylate, dipentaerythritol dimethacrylate, glycerin trimethacrylate, ethylene glycol dimethacrylate, butanediol dimethacrylate, trimethylolpropane trimethacrylate, tetramethylolmethane tetramethacrylate, bisphenol-A dimethacrylate, bisphenol-A diglycidyl methacrylate, 2,2,'-bis-(4-methacryloxyethoxyphenyl) propane and so on.

Also included among the polymerizable monomers which may be used are the vinyl urethane or urethane-acrylate prepolymers which are well known in the art. These prepolymers are polymerizable by free radical initiation and may be prepared, for example, by reacting an organic diisocyanate or an isocyanate-terminated urethane prepolymer with an ethylenically unsaturated monomer which is reactive with the diisocyanate or urethane prepolymer. These polymers also may be prepared by reacting a hydroxyl-containing material, such as a polyol or a hydroxyl-terminated urethane prepolymer with an ethylenically unsaturated monomer which is reactive with the polyol or hydroxyl-terminated urethane. The urethane prepolymers, which may be linear or branched, carry isocyanate end groups and generally are prepared by reacting a compound having hydroxyl functionality with a molar excess of diisocyanate.

Any of a wide variety of diisocyanates may be used to prepare the isocyanate-terminated urethane prepolymer including aliphatic, cycloaliphatic, heterocyclic, and aromatic diisocyanates, and combinations of these. Examples include, but are not limited to, 2,4-tolylene diisocyanate, 2,6-tolylene diisocyanate, 1,4-phenylene diisocyanate, 2,2,4-trimethyl hexamethylene diisocyanate, hexamethylene diisocyanate, 1,4-naphthalene diisocyanate, 1,5-naphthalene diisocyanate, 4,4,'-diphenylmethane diisocyanate, p,p,'-diphenyl diisocyanate, butylene-1,4-diisocyanate, ethylene diisocyanate, trimethylene diisocyanate, tetramethylene-1,4-diisocyanate, butylene-2,3-diisocyanate, cyclohexylene-1,2-diisocyanate, methylene-bis-(4-phenyl-isocyanate), diphenyl-3,3,'-dimethyl-4,4,'-diisocyanate, xylylene diisocyanate, cyclohexane-1,4-diisocyanate, 1-methoxyphenyl-2,4-diisocyanate and the like, and mixtures thereof.

A wide variety of compounds having hydroxyl functionality may be used to form the isocyanate-terminated urethane prepolymers. For example, diols of the structure

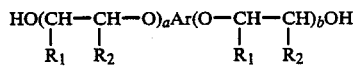

, may be used, where $R_1$ and $R_2$ are hydrogen atoms or alkyl groups, e.g., methyl, and Ar is a divalent aromatic group in which each free valency is on an aromatic carbon atom, and where a and b, independently, may be zero or an integer. Other suitable hydroxyl containing compounds include diols and polyols such as ethylene glycol, propylene glycol, triethylene glycol, tetramethylene glycol, trimethylolpropane, pentaerythritol, dipentaerythritol, and the like, or esters of acrylic acid, methacrylic acid or itaconic acid or the like with aliphatic polyhydric alcohols. Among the more preferred hydroxyl containing compounds are the esters of acrylic or methacrylic acid and a hydroxyalkanol of at least two carbon atoms such as hydroxyethyl acrylate, hydroxyethyl methacrylate, hydroxypropyl acrylate, hydroxypropyl methacrylate, hydroxyisopropyl methacrylate, and the like.

Formation of the isocyanate terminated urethane prepolymers may be assisted by the use of a catalyst known in the art to assist polyurethane formation, for example, tertiary amines and metal salts, e.g., tin salts, titanium salts and the like.

To form the vinyl urethane or urethane-acrylate prepolymer starting materials, an isocyanate-terminated urethane prepolymer or a diisocyanate is reacted with an ethylenically unsaturated compound having hydroxyl functionality. These compounds include for example, esters of acrylic acid, methacrylic acid or itaconic acid with aliphatic polyhydric alcohols, such as hydroxyethyl acrylate, hydroxypropyl methacrylate or the like. The resulting vinyl urethanes are well known in the art and are described for example, in U.S. Pat. No. 3,629,187 to Waller, U.S. Pat. No. 3,759,809 to Carlick et al, U.S. Pat. No. 3,709,866 to Waller and U.S. Pat. No. 4,459,193 to Ratcliffe et al, all of these patents being incorporated herein by reference.

Formation of the vinyl urethane prepolymers may be assisted by the use of the same catalysts noted above, namely, tertiary amines and metal salts.

Of course, the foregoing list of polymerizable ethylenically unsaturated monomers and prepolymers is intended to be exemplary only, and other known polymerizable materials can be used in compositions of this invention.

In practice, a mixture of two or more ethylenically unsaturated materials may be, and commonly is, employed. In the preferred aspects of the invention the polymerizable monomer portion of the composition is liquid at ambient temperature, e.g. about 20°-25° C.

The polymerizable monomer portion of the composition generally should comprise from about 0.5 to about 99.998% by weight of the composition, with amounts ranging from about 1 to about 99.98% being preferred, and amounts ranging from about 1.5 to about 99.8% being more preferred.

The phosphorus derivative which is used as an adhesion promoter in the present composition, may comprise any of the the well known phosphorus-containing adhesion promoters which are free from any halogen atoms covalently or otherwise bonded directly to a phosphorus atom. The phosphorus derivative may be polymerizable or non-polymerizable, however the preferred phosphorus-containing adhesion promoters comprise polymerizable phosphorus materials having ethylenic unsaturation and include, among others, organic esters of one or more acids of phosphorus (hereinafter referred to as phosphorus acid esters), wherein the organic portion of the ester contains at least one polymerizable ethylenically unsaturated group. The organic portion of the ester may be alkenyl, alkenoxy, cycloalkenyl, aralkenyl, or alkenaryl, and preferably may have from 2 to 40 carbon atoms. The organic portion may be straight chain, branched, or cyclic, can contain skeletal hetero atoms, i.e., atoms other than carbon, and can be unsubstituted or substituted with moieties which do not interfere with the free radical polymerization of the phosphorus acid esters.

Examples of saturated and unsaturated phosphorus acid esters which may be used include, but are not limited to, monomers containing phosphoric acid groups such as hydroxyethyl methacrylate monophosphate, 2,2,'-bis($\alpha$-methacryloxy-$\beta$-hydroxypropoxyphenyl) propane diphosphonate (BIS-GMA diphosphonate), BIS-GMA diphosphate, dibutyl phosphite, di-2-ethylhexyl phosphite, di-2-ethylhexyl phosphate, glyceryl-2-phosphate, glycerylphosphoric acid, methacryloxyethyl phosphate, and glyceryl dimethacrylate phosphate. Other suitable polymerizable phosphorus acid esters are disclosed, for example, in U.S. Pat. No. 4,499,251 to Omura et al, U.S. Pat. No. 4,222,780 to Shibantani et al, U.S. Pat. No. 4,235,633 to Tomioka, U.S. Pat. No. 4,259,117 to Yamauchi et al, U.S. Pat. No, 4,368,043 to Yamauchi et al, and U.S. Ser. No. 464,778 to Prodger, Billington & Blackwell filed Feb. 7, 1983, and assigned to the assignee of this invention. Of the polymerizable phosphorus acid compounds disclosed in the above patents and application, each of which is incorporated herein by reference, the preferred compounds are those polyethylenically unsaturated monophosphates of the formula:

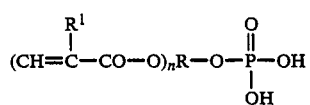

and salts thereof, in which

R is an organic radical having a valency of n +1; and R may be interrupted by one or more oxygen atoms and may be substituted or unsubstituted, and may comprise an aliphatic radical, or a cycloaliphatic radical, or an aryl radical;

$R^1$ is a hydrogen atom, alkyl $C_1$–$C_3$, halogen or CN radical, and n is an integer of at least 1.

Preferably n is an integer of 2 or more, and more preferably from 3 to 6. Examples of the preferred compounds include pentaerythritol triacrylate monophosphate, pentaerythritol trimethacrylate monophosphate, dipentaerythritol pentaacrylate monophosphate, and dipentaerythritol pentamethacrylate monophosphate.

The phosphorus acid compound normally should comprise from about 0.25 to about 99.998% by weight of the adhesive composition, with amounts ranging from about 1 to about 50% being preferred. In a more preferred embodiment the phosphorus acid compound would comprise from about 2 to about 29.8% by weight of the composition.

The catalyst component may comprise any of those free radical initiators normally used in conjunction with polymerizable ethylenically unsaturated materials, although those which will initiate polymerization at room temperature are preferred. Thus, the catalyst may comprise, for example, an organic peroxide type initiator such as dibenzoyl peroxide, dilauroyl peroxide, acetyl peroxide, benzoyl peroxide t-butyl peroxybenzoate, cumene hydroperoxide and the like. In a preferred aspect, the catalyst comprises an actinic light sensitive initiator, such as ultraviolet light-sensitive initiators or visible light sensitive initiators. As examples of suitable ultraviolet light-sensitive initiators there may be mentioned the monoketals of an aromatic 1,2-diketone, benzophenones, substituted benzophenones, benzoin methyl ether, isopropoxybenzoin, benzoin phenyl ether or benzoin isobutyl ether. Among the suitable visible light sensitive initiators, α-diketones, such as camphoroquinone, are particularly preferred. The preferred initiators are the visible light sensitive initiators.

The catalyst generally is employed in the range of from about 0.001 to about 10% of the composition. In a preferred embodiment the catalyst is used within the range of from 0.01 to about 5%. In a still further preferred embodiment, from about 0.1 to about 2% by weight of catalyst is employed.

In addition to the foregoing constituents, the adhesive composition also includes an accelerator system comprising (1) an amine or amine salt or (2) a sulfinic acid or salt thereof. In a preferred embodiment both the amine or amine salt and the sulfinic acid or salt thereof are present.

The amine or amine salt may be present in an amount from 0 to about 20% by weight of the composition, whereas the sulfinic acid or salt thereof is present in an amount of from about 0 to about 10%, the combined amount being from about 0.001 to about 20 percent. In a preferred embodiment, the amine or amine salt is used in the range of 0.001 to about 10% by weight and the sulfinic acid or a sulfinic acid salt is used in the range from about 0.01 to about 5%, the combined weight being in the range from about 0.01–15% by weight. In a still more preferred embodiment, the amine or amine salt is used in an amount from about 0.1–8% and the sulfinic acid or salt thereof is used in an amount from 0.1–2%, the combined amount ranging from about 0.2 to 10% by weight.

The amine or amine salt employed in the preferred aspects of this invention desirably is a secondary or tertiary amine rather than a primary amine, since the use of a secondary or tertiary amine leads to significantly accelerated curing. Examples of suitable amines include N,N-dimethylaniline, N,N-dimethyl-p-toluidine, N-methyl-N-β-hydroxyethylaniline, N,N-di-β-hydroxyethylanaline, N-methyl-analine, N-methyl-p-toluidine, dimethylamino benzoic acid and its esters and butyl diethanolamine. In a preferred aspect, the amine or amine salt comprises a (meth)acrylate group. Examples of such amines and their acrylic or methacrylic acid amine salts include dimethylaminoneopentyl (meth)acrylate, morpholinoethyl methacrylate, morpholinoethyl acrylate and the like.

The salt of sulfinic acid employed in the invention may be a salt of any organic sulfinic acid, but in terms of stability, a salt of a sulfinic acid attached to an aryl group is desirable. The salts may be alkali metal salts, alkaline earth metal salts and amine salts, although the alkali metal and alkaline earth metal salts are preferred. As examples of suitable sulfinic acid salts there may be mentioned sodium benzene sulfinate, calcium benzene sulfinate, triethyl ammonium benzene sulfinate, lithium toluene sulfinate, benzene sulfinic acid, N,N-dimethyl-p-toluidine sulfinate and the like. Particularly desirable are the salts of toluene sulfinic acid. The sulfinic acid or sulfinic acid salt acts as an accelerator for the catalyst system as does the amine salt and it has been found that, in a preferred aspect of this invention, both constituents should be present to ensure the desired adhesive strength and rate of polymerization of the composition.

The relative amounts of initiator, amine or amine salt and sulfinic acid or salt thereof is selected such that the composition will be shelf-stable, i.e., will not self-cure in less than about 3 months when stored at 20° C. and less than about 2 days when stored at 50° C. In this application, a composition will be considered to have self-cured at the intended operating temperature when it has polymerized to the extent that it has become solid.

The adhesive composition optionally may include a non-reactive solvent such as an alcohol, e.g. ethanol. When used, the solvent would comprise as much as about 90% by weight of the composition.

As necessary, other polymers, fillers, stabilizers and so forth may be incorporated in the composition of this invention. As the polymers incorporated to reduce the polymerization shrinkage or for viscosity adjustment, there may be mentioned polymethyl acrylate (or methacrylate), polyethyl acrylate (methacrylate), polyhydroxyethyl methacrylate, polystyrene, unsaturated polyesters, etc. The fillers may include aluminum oxide, α-quartz powders, colloidal silica, glass beads etc. within the range of about 0.04 to about 100 microns in particle diameter.

As examples of said stabilizers, there may be mentioned butylated hydroxy toluene, hydroxymethoxybenzophenone, and the like.

As will be appreciated, conventional systems which employ reactive free radical initiator systems, such as a peroxide-amine system, or a peroxide-sulfinic acid-amine system, require that the catalyst or initiator system be brought into contact with the polymerizable monomer and phosphorus acid compound only immediately before introducing the adhesive composition into a dental cavity. To this end it is common practice to put up the initiator system in two-part packs, one part containing the initiator and the other part containing the accelerator, with the polymerizable constituents being mixed with either or both of the initiator and accelerator. In accordance with the invention of the present application, however, the adhesive is formulated such that it can be put up in a single, shelf-stable pack; and in preferred embodiments the adhesive is to be polymerized by actinic radiation.

In addition to being especially suited for adhesion to dentin, the adhesive composition of the present invention adheres quite well to tooth enamel. Accordingly, the composition may be used in orthodontics, for example, to bond orthodontic brackets or bands to tooth enamel, or in periodontics, for the treatment of enamel to which a splint is to be attached.

Further, the composition may be used as an adhesive in the buildup of teeth with composite materials and the attachment of acrylic veneers via a composite or unfilled resin for the same purpose. Similarly, they may be used as adhesives in the attachment of single unit pontics to the abutment teeth via a composite or unfilled resin.

It also has been found that the adhesive composition of the present invention may be used to adhere composite materials to metal substrates, and in this connection, the adhesive composition can find application in the construction of crowns and bridges in which a polymeric material is bonded to the framework or substrate formed of a metal, such as a chromium/cobalt alloy, a gold/copper alloy or the like, or such metals coated with reactive oxide layers as, for example, tin oxide, silicon dioxide, aluminum oxide and the like.

It is also contemplated that the primers and adhesives of this invention may be filled to such an extent that they would serve not only as primers and adhesives, but also as pit and fissure sealants and dental filling composites.

When used as a primer, the primer composition of the invention is used to modify the smear layer. The composition adheres strongly to underlying dentin and provides a highly desirable surface (modified layer) to receive an overlaying adhesive, such as PRISMA BOND ® or PRISMA UNIVERSAL BOND ®, and composite material.

When used as a primer, the composition of the invention comprises by weight about 5-20% PENTA, 0-61% hydroxyethyl methacrylate, 0.1% butylated hydroxytoluene, the remainder of the composition being an inert solvent.

By inert solvent it is meant a chemical which has the effect of reducing the viscosity of the primer composition but, in its use in the composition, has a negligible effect on the hard tissue which is coated by the composition.

Examples of inert solvents that may be used in the primer of the invention are 95% ethanol (azeotropic), 100% ethanol (neet), acetone, ethyl acetate and mixtures thereof. Preferred are 95% ethanol and 100% ethanol.

The solvent lowers the viscosity of the primer so that the primer can easily coat the surface of the hard tissue and flow into fistula or crevices in the hard tissue. After application, the solvent evaporates leaving a film of primer composition on the hard tissue.

Preferred compositions of the invention have been found to contain 6% or 11% PENTA.

Using the primer composition of the invention, it has been found that in vitro the bond strength of composite fillings is approximately doubled compared to the bond strength of composite fillings prepared using conventional procedures without using the primer. It has also been found that a composite filling prepared using the primer of the invention also exhibits improved microleakage properties.

In this specification the term "(meth)acrylate" is intended to refer to an acrylic or methacrylic acid moiety, and the term "polymerizable monomer or prepolymer" is intended to refer to monomers, dimers, trimers or oligomers which contain ethylenic unsaturation and which may be polymerized by free radical initiation, including phosphorus derivatives containing ethylenic unsaturation. The ranges of "polymerizable monomer portion" recited herein include the phosphorus-containing adhesive promoter to the extent that the phosphorus-containing adhesive promoters are polymerizable phosphorus materials having ethylenic unsaturation. All of the percentages recited herein are by weight based on the weight of the entire composition unless otherwise stated.

Having generally described the invention, a more complete understanding can be obtained with reference to certain specific examples, which are included for purposes of illustration only. It should be understood that the invention is not limited to the specific details of the Examples.

EXAMPLE 1

Preparation of Urethane Dimethyacrylate (UDMA)

To a mechanically stirred mixture of 59.19 weight parts of dry hydroxypropyl methacrylate (HPMA), 0.0177 weight parts of monomethyl ether hydroquinone (MEHQ) and 0.05 weight parts of stannous octoate in a reactor, heated to 45° C. and purged with dry air, there is added 40.76 weight parts of trimethylhexamethylene diisocyanate while maintaining the reaction temperature at 45° to 55° C.

After the addition is complete, the reaction mixture was held for 16 hours at 50° to 55° C. and heated at 70° C. until the % NCO assay is below 0.01%.

EXAMPLE 2

Dipentaerythritol Pentaacrylate Phosphoric Acid Ester (PENTA)

A solution of technical dipentaerythritol monohydroxypentaacrylate (1 mole) and triethylamine (1 mole) in dry ether was slowly added with stirring to a solution of phosphorus oxychloride (1 mole) in dry ether, at 0° C. After stirring for two hours at room temperature, the triethylamine hydrochloride formed was filtered off and the product remaining in solution was hydrolyzed by addition of the ether solution to ice water with stirring at below 10° C. The resultant mixture was separated and the separated ether layer was then extracted with a 25% aqueous sodium carbonate solution. The aqueous extract exhibited a PH of about 8. The alkaline aqueous extract was then acidified with 18% acid and an oily material was formed. The oily material was extracted with methylene chloride and the extract was dried over anhydrous sodium sulphate. The methylene chloride was then removed from the dried extract under reduced pressure to give the title compound as a clear straw-colored oil.

EXAMPLE 3

A general procedure for the preparation of all of the resins used for the bond strength testing is illustrated as follows:

| Resin A | Weight Part |
| --- | --- |
| UDMA | 59.72 |
| Triethylene glycol dimethacrylate (TEGDMA) | 29.92 |
| Bisphenol A dimethacrylate (BPDMA) | 10.34 |
| Butylated hydroxytoluene (BHT) | 0.02 |

A mixture of these four components was mixed with agitation at 25 to 50 C until a homogeneous solution was obtained.

| Composition B1 | Weight Part |
| --- | --- |
| Resin A | 86.59 |
| Dipentaerythritol pentaacrylate phosphoric acid ester of Example 2 (PENTA) | 9.55 |
| butyl diethanol amine (BDE) | 3.38 |
| lithium a-toluene sulfinate (LTS) | 0.24 |
| Camphoroquinone (CQ) | 0.24 |

This activated resin is prepared by the method described for Resin A, except that the entire operation was carried out under yellow lighting or red lighting which does not cure the resin.

EXAMPLE 4

The following dentin bonding compositions were prepared by the method described in Example 3, except that the amine was varied as given in Table I, and evaluated in five replications by the method described below. All compositions shown are in parts by weight. The average bond strengths are illustrated in Table I.

TABLE I

| Composition | Resin A | PENTA | Amines | LTS | CQ | Bond (MPa) Strength | S.D. (MPa) |
| --- | --- | --- | --- | --- | --- | --- | --- |
| B1 | 86.62 | 9.55 | BDE 3.38 | 0.24 | 0.24 | 4.94 | 1.77 |
| C1 | 86.38 | 9.69 | DMANPA 3.49 | 0.22 | 0.22 | 8.08 | 3.10 |
| D1 | 86.16 | 9.18 | MPEMA 4.18 | 0.24 | 0.24 | 6.75 | 2.29 |
| E1 | 86.42 | 9.53 | MPEA 3.87 | 0.24 | 0.24 | 5.77 | 2.57 |

As shown in Table I, the amines containing a polymerizable substituent such as acrylate or methacrylate appear to afford more favorable bond strengths. The following abbreviations in Example 4 have not been identified previously:
1. MPa is Mega Pascals.
2. DMANPA is dimethylaminoneopentyl acrylate.
3. MPEMA is 2-N-morpholinoethyl methacrylate.
4. MPEA is 2-N-morpholinoethyl acrylate.
5. S. D. is standard deviations.

EVALUATION METHOD

Preparation of Teet

Extracted human teeth used for the bond strength testing were treated in 1% sodium hypochlorite for 18 to 24 hours, washed with water, mechanically sanded with 120/320/600 grit carborundum paper until the dentin was exposed, and then hand sanded with 600 grit carborundum powder on a glass slab. The prepared teeth were stored in distilled water in a refrigerator at about 4° C. until needed.

Method of Bond Strength Test

The teeth were then individually prepared as follows: Each tooth was blow dried with compressed dry air to ensure the dentin surface was free from noticeable moisture. The data presented in Tables II, III, IV, V and VII were obtained by preparing samples by applying test compositions (bonding agent) on prepared tooth structure with a brush and drying the test composition to a thin film on the surface by hitting the sample with compressed air. The data presented in Tables VIII, IX, X and XI were obtained by applying primer with a brush to a prepared tooth surface, letting the primer stand for one minute, and then blowing the primer dry with compressed air. A bonding agent, such as PRISMA BOND ® or PRISMA UNIVERSAL BOND ® was then applied with a brush to the primer surface, blown dry with compressed air and light cured with a PRISMETICS ® Lite for 10 seconds. A small plastic straw with 3.68 mm of inner-diameter and 2 to 3 mm of length was filled with uncured PRISMA-FILL ® composite filling material (a light curing composite filling material sold by L. D. Caulk Division of Dentsply International, Inc.) and seated on the dentin so as to form a post. The upper open end of the straw was covered with a thin film of cellophane. Gentle pressure was applied to the post through the cellophane with the tip of the handpiece of a PRISMA-LITE ® light curing unit (sold by L. D. Caulk Division of Dentsply International, Inc.). The unit was activated and the composite was cured for 30 seconds. The specimens were stored in distilled water at 37° C. for 1 to 3 days and their posts were sheared on an INSTRON with 50 kg load and 5 mm/min. head speed. The shear bond strengths were calculated and are shown in the following tables.

EXAMPLE 5

The following compositions illustrate the concentration effects on bond strengths of amines shown in Table I. These resins were prepared by the method described in Example 3 and were evaluated by the method described in Example 4. The compositions shown are in weight parts and the bond strengths are summarized in the following tables. All compositions designated by the letter B, with the exception of B8, contain BDE; all compositions designated by the letter C, with the exception of C6, contain DMANPA; and all compositions designated by the letter D, with the exception of D6, contain MPEMA.

TABLE II

| Composition | Resin A | PENTA | BDE | LTS | CQ | Bond (MPA) Strength | S.D. (MPA) |
|---|---|---|---|---|---|---|---|
| B1 | 86.62 | 9.55 | 3.38 | 0.24 | 0.24 | 4.94 | 1.77 |
| B2 | 86.54 | 9.75 | 3.47 | 0.00 | 0.24 | 4.28 | 1.97 |
| B3 | 86.69 | 9.51 | 3.44 | 0.24 | 0.12 | 5.97 | 3.72 |
| B4 | 91.25 | 4.81 | 3.46 | 0.24 | 0.24 | 4.42 | 3.30 |
| B5 | 96.14 | 0.00 | 3.38 | 0.24 | 0.24 | 1.48 | 2.69 |
| B6 | 85.78 | 9.85 | 6.97 | 0.25 | 0.25 | 2.91 | 1.11 |
| B7 | 88.28 | 9.55 | 1.69 | 0.24 | 0.24 | 2.10 | 0.61 |
| B8 | 89.97 | 9.55 | 0.00 | 0.24 | 0.24 | 3.99 | 2.55 |

TABLE III

| Composition | Resin A | PENTA | DMANPA | LTS | CQ | Bond (MPA) Strength | S.D. (MPA) |
|---|---|---|---|---|---|---|---|
| C1 | 86.38 | 9.65 | 3.49 | 0.22 | 0.22 | 8.08 | 3.10 |
| C2 | 88.12 | 9.64 | 1.87 | 0.12 | 0.24 | 6.24 | 2.2 |
| C3 | 95.82 | 0.00 | 3.71 | 0.24 | 0.24 | 0.16 | 0.27 |
| C4 | 76.21 | 19.34 | 3.96 | 0.24 | 0.24 | 3.15 | 1.45 |
| C5 | 85.67 | 10.42 | 3.67 | 0.00 | 0.24 | 4.26 | 3.61 |
| C6 | 89.62 | 9.96 | 0.00 | 0.25 | 0.17 | 4.77 | 1.05 |
| C7 | 92.89 | 4.82 | 1.93 | 0.12 | 0.24 | 6.35 | 2.29 |
| *C8 | TEGDMA 46.05 | 46.48 | 6.94 | 0.17 | 0.17 | 4.89 | 1.30 |

*Use TEGDMA in place of Resin A in the composition C8 formulation.

TABLE IV

| Composition | Resin A | PENTA | MPEMA | LTS | CQ | Bond (MPA) Strength | S.D. (MPA) |
|---|---|---|---|---|---|---|---|
| D1 | 86.16 | 9.18 | 4.18 | 0.24 | 0.24 | 6.75 | 2.29 |
| D2 | 76.43 | 18.99 | 4.11 | 0.23 | 0.23 | 5.68 | 2.12 |
| D3 | 87.93 | 9.53 | 2.07 | 0.24 | 0.24 | 4.83 | 1.72 |
| D4 | 86.11 | 9.4 | 4.14 | 0.12 | 0.24 | 6.30 | 1.11 |
| D5 | 81.76 | 9.46 | 8.32 | 0.22 | 0.24 | 7.17 | 2.62 |
| D6 | 89.62 | 9.96 | 0.00 | 0.25 | 0.17 | 4.77 | 1.05 |
| D7 | 92.83 | 4.73 | 2.08 | 0.12 | 0.24 | 5.88 | 2.41 |

As illustrated in Tables II–IV, the following conclusions may be drawn:
1. Without PENTA in the compositions, the adhesion is very poor.
2. Sufficient adhesion can be obtained using either an amine or LTS accelerator.
3. Superior adhesion is obtained when both an amine and LTS accelerator is used.

EXAMPLE 6

Other adhesion promoters such as polymerizable and non-polymerizable phosphates, phosphonates and phosphites in place of PENTA are illustrated in this Example. The composition preparation and test method were the same as described in Examples 3 and 4, except as otherwise indicated. The bond strengths are summarized in Table V.

TABLE V

| Composition | Resin A | Adhesion Promoter | Amines | LTS | CQ | Bond (MPA) Strength | S.D. (MPA) |
|---|---|---|---|---|---|---|---|
| F | 83.93 | PETMAP 9.64 | MPEMA 5.96 | 0.24 | 0.24 | 4.02 | 1.54 |
| G | 88.1 | GPDMA 9.7 | DMANPA 1.85 | 0.24 | 0.12 | 2.68 | 3.18 |
| H | 85.95 | HEMAP 9.52 | DMANPA 4.12 | 0.23 | 0.18 | 1.66 | 1.8 |
| *I | 94.11 | BISGMAPP 4.77 | DMANPA 0.94 | 0.12 | 0.06 | 2.12 | 1.08 |
| J | 87.28 | GP 8.65 | DMANPA 3.72 | 0.23 | 0.12 | 0.5 | 1.45 |
| K | 85.92 | DP 9.4 | MPEMA 4.2 | 0.24 | 0.24 | 1.78 | 2.5 |
| L | 86 | DEHPA 9.38 | MPEMA 4.15 | 0.24 | 0.24 | 1.99 | 2.23 |
| M | 85.9 | DEHPI 9.45 | MPEMA 4.18 | 0.24 | 0.24 | 3.30 | 2.04 |
| **N | 43.07 | BISGMAP 9.66 | DMANPA 1.73 | 0.11 | 0.11 | 2.77 | 0.77 |

The following abbreviations in Example 6 have not been identified previously:
1. PETMAP is Pataerythritol trimethacrylate phosphoric acid ester.
2. GPDMA is glycerol 2-phosphate dimethacrylate.
3. HEMAP is 2-methacryloxyethyl phenyl phosphate.
4. BISGMAPP is BIS-GMA di(phenyl phosphate).
5. GP is glycerol 2-phosphate.
6. DP is dibutyl phosphite.
7. DEHPA is di(2-ethylhexyl) phosphate.
8. DEHPI is di (2-ethylhexyl) phosphite.
9. BISGMAP is BIS-GMA diphosphate.

In comparing the results shown in Table V with those illustrated in Tables II, III and IV, it is apparent that the use of the polymerizable phosphates PENTA and PETMAP resulted in compositions which exhibit superior adhesion.

* Composition I was required to be mixed with an equal volume of ethanol to form a homogeneous solution and then was applied on the dentin surface.
** Composition N was mixed with an equal part of methanol and then was applied on dentin surface.

EXAMPLE 8

The following compositions O, P, and Q were prepared and the stability of each composition was tested.

Composition O

| | |
|---|---|
| Dibenzoyl Peroxide | 1 weight part |
| Polymethyl Methacrylate | 20 weight part |
| LTS | 3 weight part |

The above components were charged into vessel and blended until homogenous. The composition O is a powder blend.

Composition P

| | |
|---|---|
| CQ | 1 weight part |
| Polymethyl Methacrylate | 20 weight part |
| LTS | 3 weight part |

Composition P was prepared in the same manner as for composition O. This composition also is a powder blend.

Composition Q

| | |
|---|---|
| PENTA | 20 weight part |
| Ethylene Glycol Dimethacrylate | 20 weight part |
| N,N-Demethyl para-Toluidine | 2 weight part |

Composition Q was prepared in accordance with Example 3. This liquid composition was mixed with an equal weight part of composition O or P. The mixture of Q and O formed a solid mass instantaneously. The mixture of compositions Q and P, which were mixed and stored in the dark at room temperature, resulted in a soft unusable gel within two hours.

Composition Q, by itself, was stable when stored in a clear amber bottle at room temperature for more than two weeks. Example 8 illustrates that the simple substitution of a light cure initiator (CQ) for an acyl peroxide inititator (BPO) does not, in and of itself, result in an acceptably stable one component composition.

It is evident from the foregoing example that the invention may be described as comprising a liquid polymerizable dental adhesive composition comprising a polymerizable monomer or prepolymer, a catalyst active on command to catalyze the polymerization of the polymerizable monomer or prepolymer, and an accelerator and adhesion promoting system comprising at least two components which are balanced either in concentration or activity or both such as to provide at least three months of usable shelf life. Another characteristic of the accelerator adhesion promoting system components is that when the components are not in close tolerance balance they bring about premature polymerization of the polymerizable monomer or prepolymer or fail to bring about the polymerization of the polymerizable monomer or prepolymer within less than three minutes.

EXAMPLE 9

STABILITY TEST

Seven resin compositions shown in Example 5 were selected for stability study. They were kept at room temperature at 20° C. to 25° C. and in an oven at 50° C. separately and visually inspected for whether they would gel on standing over a period of time. The results are illustrated in Table VI. Further, the shear bond strengths were determined after a week at 50° C. for these compositions by the method described in Example 4. The test results are summarized in Table VII.

TABLE VI

| Compositions | Time Elapsed | Conditioning Temperature | Physical Appearance |
|---|---|---|---|
| B1 | 2½ - Month | 20°-25° C. | Liquid |
| B1 | 2 - Week | 50° C. | Liquid |
| B2 | 2½ - Month | 20°-25° C. | Liquid |
| B8 | 2½ - Month | 20°-25° C. | Liquid |
| C1 | 2½ - Month | 20°-25° C. | Liquid |
| C1 | 2 - Week | 50° C. | Liquid |
| C5 | 1½ - Month | 20°-25° C. | Liquid |
| C6 | 1½ - Month | 20°-25° C. | Liquid |
| D1 | 2½ - Month | 20°-25° C. | Liquid |
| D1 | 2 - Week | 50° C. | Liquid |

TABLE VII

| Compositions | Bond Strength (MPa) | S.D. (MPa) |
|---|---|---|
| B1 | 4.84 | 1.82 |
| B2 | 2.21 | 1.43 |
| C1 | 8.39 | 3.77 |
| C5 | 6.19 | 3.92 |
| D1 | 7.88 | 2.50 |
| B8 | 2.56 | 1.01 |
| C6 | 1.77 | 1.16 |

EXAMPLE 10

This example illustrates several specific compositions which were tested for use as a primer, and the bond strength and microleakage values exhibited by the compositions.

It will be noted from Table VIII that the LCH 24-163-3 and LCH 25-20-3 compositions, which employ 95% ethanol give particularly strong and consistent results.

It is noted that 1 MPa=145 psi.

TABLE VIII

| COMPOSITION (wt. %) of ONE-COMPONENT PRIMER | | | | | | | |
|---|---|---|---|---|---|---|---|
| | LCH 24-163- | | | | | | |
| | 1 | 2 | 3 | 3R | 4 | 4R | 9 |
| PENTA | 11 | 11 | 11 | 11 | 11 | 11 | 20 |
| HEMA | 30 | 30 | 30 | 30 | 30 | 30 | — |
| BHT | 0.1 | 0.1 | 0.1 | 0.1 | 0.1 | 0.1 | 0.1 |
| ACETONE | 58.9 | — | — | — | — | — | 80 |

TABLE VIII-continued

| COMPOSITION (wt. %) of ONE-COMPONENT PRIMER | | | | | | | |
|---|---|---|---|---|---|---|---|
| EtOAc | — | 58.9 | — | — | — | — | — |
| EtOH(190PF) | — | — | 58.9 | 58.9 | — | — | — |
| EtOH(200PF) | — | — | — | — | 58.9 | 58.9 | — |
| H20 | — | — | — | — | — | — | — |
| B.S. TO DENTIN: (MPa)[1] | | | | | | | |
| R.T./PB[2] | 10.70 | 10.46 | 16.48 | 14.38 | 27.10 | 10.87 | |
|  | (2C;2.57) | (2C;4.75) | (3C;9.47) | (2C;5.47) | (4C;6.63) | (1C;2.08) | |
| 1 WK @ 50° C./PB[2] | 17.86 | 11.16 | 16.99 | 17.21 | 10.81 | 13.35 | |
|  | (5C;8.53) | (0C;7.35) | (5C;5.79) | (3C;6.65) | (3C;4.97) | (1C;6.46) | |
| 2 WK @ 50° C./PB[2] | 13.18 | 9.96 | 17.85 | 11.03 | 9.85 | 18.19 | |
|  | (1C;7.22) | (1C;4.28) | (4C;7.12) | (2C;10) | (2C;4.42) | (5C;7.45) | |
| R.T./PUB | 19.60 | | | | | | 10.39 |
|  | (5C;6.41) | | | | | | (2C;7.79) |
| 2 WK @ 50° C./PUB | 17.53 | | 19.12 | | | | |
|  | (1C;6.01) | | (5C;7.40) | | | | |
| R.T. (2 Months)/PUB | 17.25 | | 19.86 | | 23.76 | 19.09 | |
|  | (4C;6.21) | | (4C;4.15) | | (4C;2.94) | (2C;9.99) | |

| | LCH 25-20- | | | CTH-3-56- | | | |
|---|---|---|---|---|---|---|---|
| | 1 | 2 | 3 | 9 | 18 | 10 | 17 |
| PENTA | 10 | 6 | 6 | 12 | 12 | 6 | 6 |
| HEMA | — | 30 | 30 | 55 | 55 | 61 | 59 |
| BHT | 0.1 | 0.1 | 0.1 | — | 0.1 | — | 0.1 |
| ACETONE | 89.9 | — | — | — | — | — | — |
| EtOAc | — | — | — | — | — | — | — |
| EtOH(190PF) | — | — | 63.9 | — | — | — | — |
| EtOH(200PF) | — | 63.9 | — | — | — | — | — |
| H20 | — | — | — | 33 | 32.9 | 33 | 34.9 |
| B.S. TO DENTIN: (MPa)[1] | | | | | | | |
| R.T./PB[2] | | | | 22.65 | 21.75 | 13.92 | 15.26 |
|  | | | | (5C;9.37) | (5C;6.64) | (3C;7.19) | (4C;4.81) |
| 1 WK @ 50° C./PB[2] | | | | | 14.68 | | 13.11 |
|  | | | | | (1C;6.59) | | (3C;5.48) |
| 2 WK @ 50° C./PB[2] | | | | | | | |
| R.T./PUB | 19.74 | 18.26 | 16.89 | | | | |
|  | (5C;10.49) | (5C;2.94) | (5C;5.33) | | | | |
| 2 WK @ 50° C./PUB | 12.03 | 15.98 | 15.20 | | | | |
|  | (1C;4.31) | (3C;2.79) | (1C;5.21) | | | | |
| R.T.(2 Months)/PUB | | | | | | | |

[1] Conditions specified are for storage of primer prior to bonding. Values in brackets indicate numbers of samples (5 tested) that failed cohesively (C) within dentin and the standard deviation.
[2] PRISMA BOND used following application of primer (i.e., non-adhesive bonding resin).

Table VIII—Several items of note (a) Range of PENTA evaluated was 6-20%. Preferred ranges are 6 and 11%.
(b) Preferred systems are LCH 24-163-3 and LCH 25-20-3.
(c) Solvents evaluated were acetone, ethyl acetate (EtOAc), ethanol (EtOH, 95% [190 proof] and 100% [200 proof]). Preferred solvent EtOH, 95%; next 100% EtOH; next acetone; next EtOAc.
(d) HEMA (Hydroxyethyl methacrylate) is preferred, but not required (see LCH 25-20-1 and LCH 24-163-9).
(e) Aqueous systems (CTH 3-56-9,18,10,17) work equally well.
(f) Adhesive low viscosity resins (i.e., PUB) are preferred but non-adhesive low viscosity resin (i.e., PRISMA BOND) also are effective.

Properties of several compositions of this example were compared with commercially available products as described in TABLE X.

The illustrated bonding system consisting of a primer and a bonding agent provides superior bond strength as compared to composition B5, which is a non-adhesive material characterized in Table II, and the one-component compositions (bonding agents or adhesives) characterized in Tables II, III, IV, V and VII. The durability of bonding between tooth tissue and restorative under wet environment was examined by subjecting the test specimens to a thermocycling by transferring the samples between 5° C. and 50° C. water baths for 540 cycles, using a residence time of 1 minute in each bath and the boiling in water, for 24 hours. The bond strengths were then measured as described in Example 4. The results in Part III of Table X indicate substantial improvement in the observed results when using primer and bonding agent together. In Table XI, the microleakage data further substantiates that superior results were obtained for the system using a primer with a bonding agent.

TABLE IX

Table IX illustrates similar properties for a two-component primer. The composition of each component can be determined by reference to the first part of the table, and the effectiveness of each combination, in terms of its bond strength, can be determined by reference to the second part of Table IX. Particularly strong and consistant results are observed for mixtures of composition mixture LCH 24-163-5 and 9; LCH 24-163-5 and 10; and CTH-75-2 and part D

TABLE IX

| COMPOSITION of TWO-COMPONENT PRIMER | |
|---|---|
| Part B | Part C |

TABLE IX-continued

COMPOSITION of TWO-COMPONENT PRIMER

| INGREDIENTS | Part A 5 | LCH24-163- 8 parts by weight | LCH24-163- 9 parts by weight | LCH24-163- 10 parts by weight | CTH3-75- 2 parts by wt. | Part D parts by weight |
|---|---|---|---|---|---|---|
| PENTA | — | 20 | 20 | 20 | 20 | — |
| HEMA | 50 | — | — | — | 80 | — |
| BHT | 0.1 | 0.1 | 0.1 | 0.1 | 0.1 | — |
| ACETONE | — | — | 80 | — | — | 50 |
| EtOAc | — | — | — | — | — | — |
| EtOH(190PF) | — | 80 | — | — | — | — |
| EtOH(200PF) | — | — | — | 80 | — | — |
| H20 | 50 | — | — | — | — | 50 |

B.S. TO DENTIN (MPa)[1]

| PRIMER SYSTEM | RATIO | R.T. | 1 WK @ 50° C. | 1 WK @ 50° C. |
|---|---|---|---|---|
| LCH24-163-5&-8 | 1 Part A/1 Part B | 20.91(4.66);(3C) | — | 4.86(1.83);(0C) |
| LCH24-163-5&-9 | 1 Part A/1 Part B | 17.37(4.81);(5C) | 24.54(12.69);(5C) | 13.74(7.50);(2C)/ 23.63(9.46);(4C) |
| REPEAT(2 Mo. R.T.)[2] | 1 Part A/1 Part B | 24.28(5.16);(4C) | | |
| LCH24-163-5&10 | 1 Part A/1 Part B | 21.24(12.70);(5C) | 13.57(9.35);(3C) | 18.0(9.30);(5C) |
| LCH24-163-5&10 REPEAT | 1 Part A/1 Part B | 13.96(7.92);(1C) | 19.27(8.58);(4C) | 13.98(5.21);(2C) |
| CTH-75-2 & Part D | 1 Part C/1 Part D | 15.78(6.19);(4C) | 16.97(8.14);(5C) | 15.98(6.84);(2C) |

[1]Conditions specified are for storage of primer prior to bonding. Values in brackets indicate numbers of samples (5 tested) that failed cohesively (C) within dentin and the standard deviation.
[2]This set used PRISMA UNIVERSAL BOND, all others used PRISMA BOND.

TABLE X

Further testing of the most promising compositions, LCH 24-163-3 and LCH 25-20-3, was carried out to determine the aging properties thereof as illustrated in Table X, Part I.

Comparisons of these compositions with currently commercially available composite systems were also made, and the results were tabulated in Table X, Part II. The results illustrate that the preparations made using the primer of the invention are clearly superior to any of the commercially available composite systems.

The hydrolytic stability of the samples was determined as described above, and is illustrated in Table X, Part III.

TABLE X

I. BOND STRENGTH TO DENTIN OF DP/PUB/PF[1]

| CONDITION OF AGING DP | LCH24-163-3 [11% PENTA] | LCH25-20-3 [6% PENTA] |
|---|---|---|
| R.T. | 19.86 MPa | 16.89 MPa |
| 1-WK @ 50 C. | 16.99 | 22.52 |
| 2-WK @ 50 C. | 19.12 | 15.20 |

II. BOND STRENGTH TO DENTIN

| SYSTEM | COMPOSITE | AVERAGE [MPa] |
|---|---|---|
| GLUMA[2] [AS RECE'D] | LUMIFOR[2]/PF | 14.68 |
| GLUMA [3-MONO R.T.] | PF | 4.87 |
| TENURE[3] | VISAR FIL[3] | 15.83 |
| SCOTCHBOND 2[4] | VALUX | 3.88 |
| PUB | PF | 9.57 |
| DP [11%]/PUB | PF | 19.86 |
| DP [6%]/PUB | PF | 16.89 |
| DP [11%]/PUB[5] | PF | 18.74 |
| DP [6%]/PUB[5] | PF | 16.49 |

III. HYDROLYTIC STABILITY OF BOND STRENGTH TO DENTIN BOND STRENGTH AVERAGE [MPa]

| CONDITIONING OF SPECIMEN | DP [11%] | DP [6%] | PUB |
|---|---|---|---|
| 24-HR @ 37 C. | 19.86 | 16.89 | 9.57 |
| THERMOCYCLED | 19.77 | 17.85 | 8.90 |
| 24-HR BOILED | 7.68 | 11.76 | 4.97 |

[1]DP = dentin primer; PUB = PRISMA UNIVERSAL BOND ®; PF = PRISMA-FIL ®
[2]GLUMA ® and LUMIFOR ® are marketed by COLUMBUS DENTAL ®
[3]TENURE ® and VISAR FIL ® are marketed by DEN MART ®
[4]SCOTCHBOND 2 ™ is marketed by 3 M
[5]Tests were performed by Dr. Wayne Barkmeier of Creighton University School of Dentistry, Omaha, Nebraska.

A number of the primer compositions, when used to compare a composite filling as described above, were tested for their microleakage properties, and the results are provided in Table XI. A microleakage of 0 is optimal, microleakage below 0.1 is excellent and microleakage below 0.3 is very good as compared to similar preparations made using conventional composite preparations without a primer.

TABLE XI

MICROLEAKAGE

| EXPT. | SYSTEM | LEAKAGE VALUE |
|---|---|---|
| CTH3-79-2B | LCH24-163-3/PUB/PF | 0 |
| CTH3-79-3B | LCH24-163-3/PUB/PF | 0.02 |
| CTH3-86-4B | LCH24-164-4/PUB/PF | 0.02 |
| CTH3-87-2 | LCH24-163-4[2-WK @ 50 C.]/PUB/PF | 0.02 |
| | LCH24-163-3[2-WK @ 50 C.]/PUB/PF | 0.2 |
| CTH3-91-1 | CTH3-89-1/PUB/PF | 0.08 |
| | PUB/PF | 0.2 |
| CTH3-91-2 | CTH3-89-1/PUB/FF | 0 |
| | PUB/FF | 0.52 |
| CTH3-91-4 | CTH3-89-1/PUB/PF | 0.08 |
| | SCOTCHBOND 2/P-50 | 1.2 |
| CTH3-88-1 | LCH25-20-2/PUB/PF | 0 |
| | LCH25-20-3/PUB/PF | 0 |
| CTH3-88-4 | CTH3-89-1/PUB/PF | 0.02 |
| | LCH24-163-3/PUB/PF | 0 |
| CTH3-26-1 | SCOTCHBOND 2/VALUX | 0.6 |
| CTH3-57-1 | GLUMA/PF | 0.8 |

NOTE:
(1) 11% PENTA CONTAINING PRIMERS: LCH24-163-3 & -4
(2) 6% PENTA CONTAINING PRIMERS: LCH25-20-2 & -3 AND CTH3-89-1.

Having now fully described the invention, it will be apparent to one of ordinary skill in the art that many changes and modifications can be made thereto without departing from the spirit or scope of the invention as set forth in the claims, wherein;

What is claimed is:

1. A primer composition for adhering to or coating, hard tissue comprising by weight about
   (a) 6 to 20% (PENTA)
   (b) an effective amount of hydroxyethyl methacrylate (HEMA)
   (c) 0.01–0.5% butylated hydroxytoluene, and
   (d) an inert solvent.

2. The primer composition of claim 1 wherein the inert solvent is selected from the group consisting of acetone, ethylacetate, ethanol and mixtures thereof.

3. The primer composition of claim 1 wherein the inert solvent is 95% ethanol.

4. The primer composition of claim 1 wherein the inert solvent is 100% ethanol.

5. The primer composition of claim 1 which exhibits a bond strength of at least about 2350 psi.

6. The primer composition of claim 1 which comprises 6% PENTA.

7. The primer composition of claim 1 which comprises 11% PENTA.

8. The primer composition of claim 1 which comprises 30% HEMA.

* * * * *